United States Patent [19]
Jaw

[11] Patent Number: 5,343,889
[45] Date of Patent: Sep. 6, 1994

[54] NOZZLE FOR INFLATABLE OBJECTS

[76] Inventor: Horng-Chang Jaw, 6th Floor, No. 21, Alley 29, Lane 372, Chung-Hsiao E. Road Section 5, Taipei, Taiwan

[21] Appl. No.: 947,486

[22] Filed: Sep. 21, 1992

[51] Int. Cl.⁵ ............... F16K 15/18; F16K 15/20
[52] U.S. Cl. .................. 137/232; 137/523; 137/855; 446/222; 446/224
[58] Field of Search ........... 137/223, 232, 522, 523, 137/848, 855; 446/222, 224

[56] References Cited
U.S. PATENT DOCUMENTS

| | | | |
|---|---|---|---|
| 2,839,073 | 6/1958 | Marsh | 137/232 |
| 2,977,973 | 4/1961 | Chakine | 446/222 X |
| 4,004,614 | 1/1977 | Mackal et al. | 446/222 X |
| 4,292,999 | 10/1981 | Szollmann | 137/232 X |
| 4,823,831 | 4/1989 | Jaw | 137/232 X |
| 4,924,899 | 5/1990 | Po | 137/232 |
| 5,119,842 | 6/1992 | Jaw | 137/232 |

FOREIGN PATENT DOCUMENTS

| | | | |
|---|---|---|---|
| 252729 | 5/1963 | Australia | 137/855 |
| 797059 | 6/1958 | United Kingdom | 137/232 |

*Primary Examiner*—John Rivell
*Attorney, Agent, or Firm*—Darjen International Patent Office

[57] ABSTRACT

A nozzle for inflatable objects being made of a plastic material, including a nozzle body and a sealing element composed of a vertical sleeve body and an one-way membrane, in which the nozzle body is incorporated with an annular nozzle seat, a conical wall is extended upward from the annular nozzle seat, an annular horizontal wall is extended from the top of the conical wall, a vertical cylindrical body is extended from the annular horizontal wall, an air passage is formed in the vertical cylindrical body, a plug which can be inserted to the air passage to seal the air passage, the sealing element is tightly fitted to the lower cylindrical body, and an one-way membrane is secured to the inner wall of the sealing element to swing freely therein and to close the air passage tightly.

3 Claims, 5 Drawing Sheets

NOZZLE FOR INFLATABLE OBJECTS

CROSS-REFERENCE TO RELATED APPLICATION

This application relates to an improvement on a sealing nozzle shown in my copending application Ser. No. 07/734/448 filed on Jul. 13, 1991.

BACKGROUND OF THE INVENTION

1. Field of the Invention

The present invention relates generally to nozzles, and more particularly, to an improved nozzle for inflatable objects, such as beach balls, beach mattresses, air pillows or the like.

2. Description of the Prior Art

The U.S. Pat. No. 4,823,831 discloses a nozzle for inflatable objects, including a nozzle seat, an annular wall extended on the top of the nozzle seat to define an air inlet passage, a plug for insertion into the air inlet passage, a plug arm connecting to the plug, and an one-way membrane beneath the air inlet passage. It is characterized by the design of a plug extension with two holes extended from the plug at a position remote from the plug arm for engagement with a tab, and the design of the one-way membrane extended from the inner wall of the nozzle seat to seal the air inlet passage. The tab has a knob at its end to help positioning of the plug in place, and has a serrated lower surface to prevent the tab from slipping back after passing through the holes. The one-way membrane beneath the air inlet passage serves as a check valve during inflation, and can be pushed away to open the air inlet passage for deflation simply by retracting the nozzle. Though the nozzle can provide satisfactory safety to inflatable objects such as swimming ring and polyvinyl chloride boat, retraction of the nozzle may detach the one-way membrane from the sealing position, and then accidentally shock to the inflatable object may remove the plug from the air inlet passage result in unwanted deflation.

SUMMARY OF THE INVENTION

The main object of the present invention is to provide a nozzle for inflatable objects including a nozzle body tightly fitted with a sealing element for the best air-tight effect.

Another object of the present invention is to provide a nozzle for inflatable objects as described above in which a plug and a sealing element are used for double sealing effect to avoid the danger arising from accidental deflation of the inflatable object, to maintain the nozzle in an air-tight condition even when the nozzle has been retracted into the inflatable object, and permit rapid discharge of air from the nozzle under control of its user.

Another object of the present invention is to provide a nozzle for inflatable objects as described above in which the nozzle body and the sealing element can be made in different colors to provide different appearances.

Another object of the present invention is to provide an improved nozzle structure which is easy to use, easy to make, and low in production cost.

Therefore, the nozzle for inflatable objects according to the present invention including a nozzle body tightly fitted with a sealing element in which the nozzle body is incorporated with an annular nozzle seat, a conical wall extended upward from the annular nozzle seat and having a lower turning edge between it and the annular nozzle seat and a top turning edge, an annular horizontal wall extended inward from the top turning edge, a vertical cylindrical body extended from the annular horizontal wall, an air passage in the vertical cylindrical body, an upper cylindrical body and a lower cylindrical body divided by the annular horizontal wall, a plug arm extended from the top of the upper cylindrical body in one lateral direction, and a tab extended from the top of the upper cylindrical body in the opposite direction; in which the plug is located between the knob and the vertical cylindrical body and defines a first plug arm portion between it and the knob as well as a second plug arm portion between it and the vertical cylindrical body, the first plug arm portion has a rib near the plug on a surface opposite to the plug, and a knob with a brake surface and a arched surface, and the first plug arm portion can pass through the hole of the tab and retained by the tab with the rib of the first plug arm; and the sealing element composed of the vertical sleeve body and an one-way membrane, the vertical sleeve body is closely fitted to the lower cylindrical body and the one-way membrane beneath the air passage to permit entry of air into the inflatable object but prevent discharge of air through the air passage during inflation in a way that insertion of the first plug arm portion into the air passage can push away the one-way membrane of the sealing element to discharge air from the inflatable object through the air passage, the brake surface of the knob can be retained by the bottom of the lower cylindrical body to maintain the one-way membrane of the sealing element in opening position, application of a downward pressure to the nozzle can retract the vertical cylindrical body and the sealing element into inflatable object by bending at the lower and top turning edges respectively, and the one-way membrane of the sealing element can be maintained to close the air passage when the nozzle is retracted.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENTS

Figure 1:
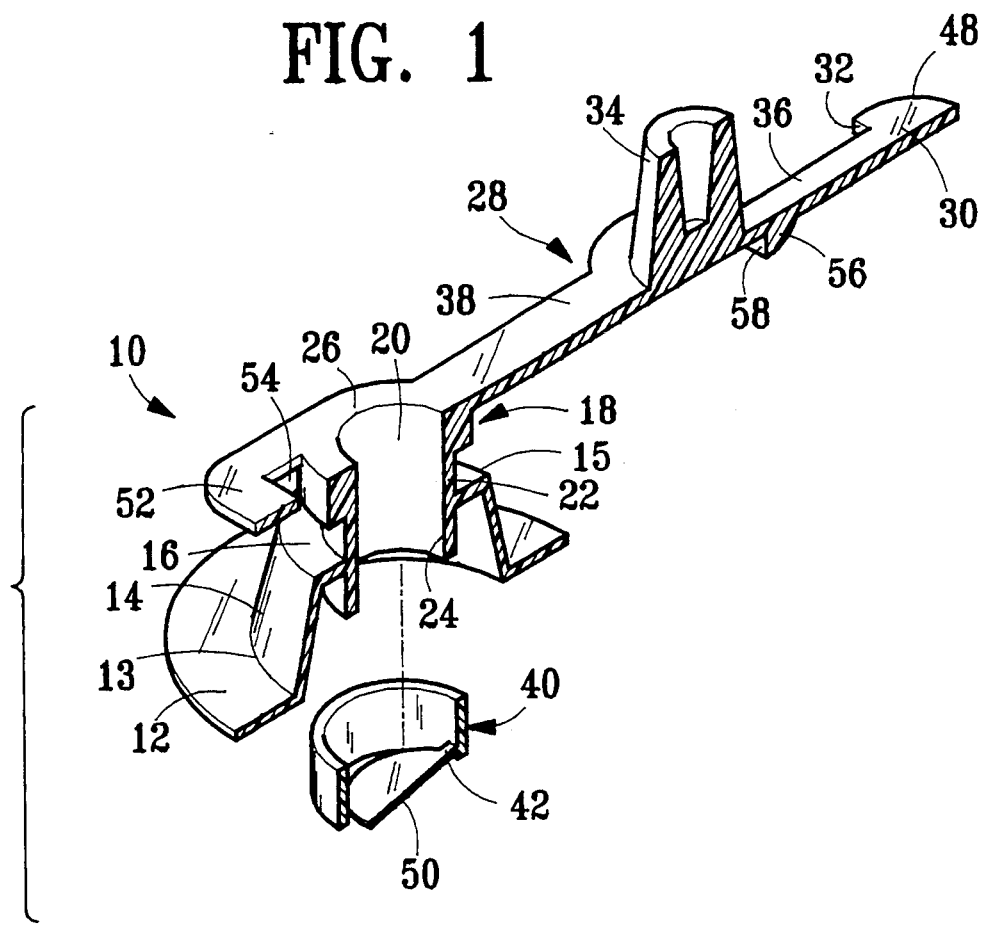
FIG. 1 is a perspective fragmental view of a nozzle for inflatable objects according to the present invention.
Figure 2:
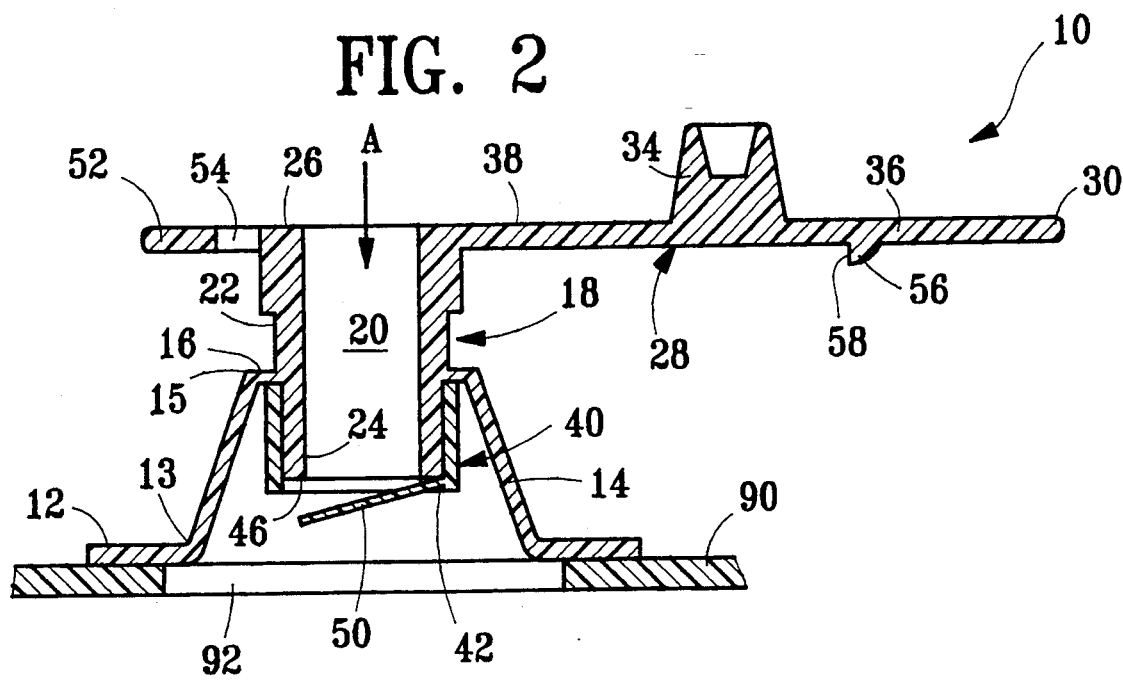
FIG. 2 is a sectional view illustrating the orientation of the nozzle at inflation condition.

Please refer to FIGS. 1 and 2, the nozzle for inflatable objects according to the present invention is made of flexible plastic material and comprises mainly a nozzle body 10 and a sealing element 40. The nozzle body comprises an annular nozzle seat 12 connected to an inflatable object by means of thermal welding such as high frequency welding, a conical wall or diaphragm 14 extended upwardly (or outwardly) from the annular nozzle seat 12, an annular horizontal wall or hinge connection 16, and a vertical cylindrical or tubular body 18 connected at approximately its midpoint to the annular horizontal wall 16. The cylindrical body 18 includes an upper cylindrical body 22 and a lower cylindrical body 24 divided by the annular horizontal wall 16. A plug arm 28 is extended from the top edge 26 of the upper cylindrical body 22 in one lateral direction, and a tab 52 is extended from the top edge 26 of the upper cylindrical body 22 in the opposite direction. The plug arm 28 includes a knob 30 in one end with brake surface 32 and an arched portion 48, and a plug 34 which can be inserted into and seal the air passage 20 formed by tubular body 18. The plug 34 is located between the knob 30 and the vertical cylindrical body 18, to define a first plug arm portion 36 between it and the knob 30 as well as a second plug arm portion 38 between it and the vertical cylindrical body 18. The first plug arm portion 36 has a rib 56 near the plug 34 on a surface opposite to the plug 34. The sealing element 40 is designed for tightly fitting to the lower cylindrical body 24. An one-way membrane 50 is secured at one end to the inner wall 42 of the sealing element 40. The one-way membrane 50 can swing freely, and is maintained is close contact with the bottom (or inner) edge of the vertical cylindrical body 18 to seal the air passage 20. When the one-way membrane 50 of the sealing element 40 has not been pushed downward by the first plug arm portion 36, it allows air to enter the inflatable object 90 from the external atmosphere through the one-way membrane 50, but does not allow the air to flow out from the inflatable object 90. However, after the first plug arm portion 36 is inserted into the air passage 20 to push away the one-way membrane 50 of the sealing element 40, and when the brake surface 32 of the knob 30 is retained on the bottom edge 46 of the vertical cylindrical body 18, air in the inflatable object 90 can flow out through the air passage 20.

Because the one-way membrane 50 that keeps the inflatable object 90 air-tight is secured to the sealing element 40 rather than the nozzle body 10, it can maintain a naturally and highly close contact with the bottom 46 of the vertical cylindrical body 18 for the best air-tight sealing effect. Moreover, the color of the sealing element 40 can be made different from the color of the nozzle body 10; the nozzle according to the present invention can be formed with different combinations of colors to provide different appearances. In the prior art, the one-way membrane is secured to the nozzle body directly in a relative slant position, and therefore it can not seal the air passage completely, air-tight sealing effect is thus adversely affected.

As shown in FIG. 2, when the inflatable object 90 is inflated with an air current in the direction of an arrow A by any means, such as an air compressor or an air pump, or inflated manually, the air current A pushes the one-way membrane 50 of the sealing element 40 downward so that the external air can enter and inflate the inflatable object 90 easily and quickly.

Figure 3:
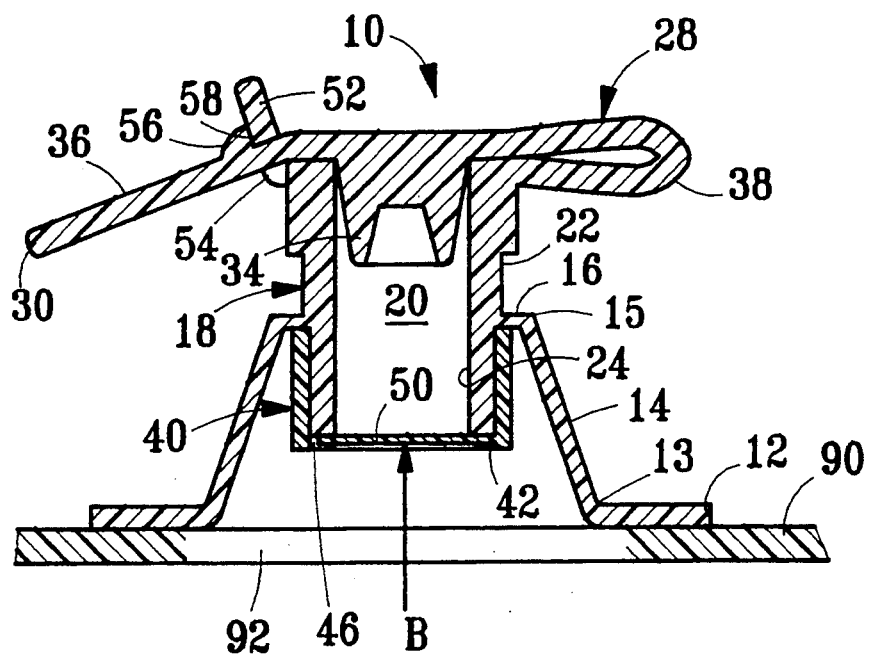
FIG. 3 is a sectional view of the nozzle at closing state.

As shown in FIG. 3, during and after the inflation process, an air current B in the inflatable object 90 applies an upward pressure to the one-way membrane 50 of the sealing element 40 so that the one-way membrane 50 is forced to keep close contact to the bottom 46 of the vertical cylindrical body 18 to seal the air passage tightly, thus avoiding the risk from accidental deflation. After inflation, the plug 34 is inserted into the air passage and 20 to seal the air passage, the first plug arm portion 36 is caused to pass through a hole 54 at the tab 52, whereby the tab is retained by a stop surface 58 of the rib 56 so that the first plug arm portion 36 will not be disengaged accidentally. Hence, after inflation, the air passage 20 is sealed by the one-way membrane 50 of the sealing element 40 and the plug 34 to prevent unwanted deflation. Moreover, even if the first plug arm portion 36 is not retained by the tab 52 due to negligence of its user and the plug is disengaged accidentally due to external factor, the one-way membrane 50 of the sealing element 40 can maintain the closing condition to seal the air passage 20 as shown in FIG. 6.

Figure 4:
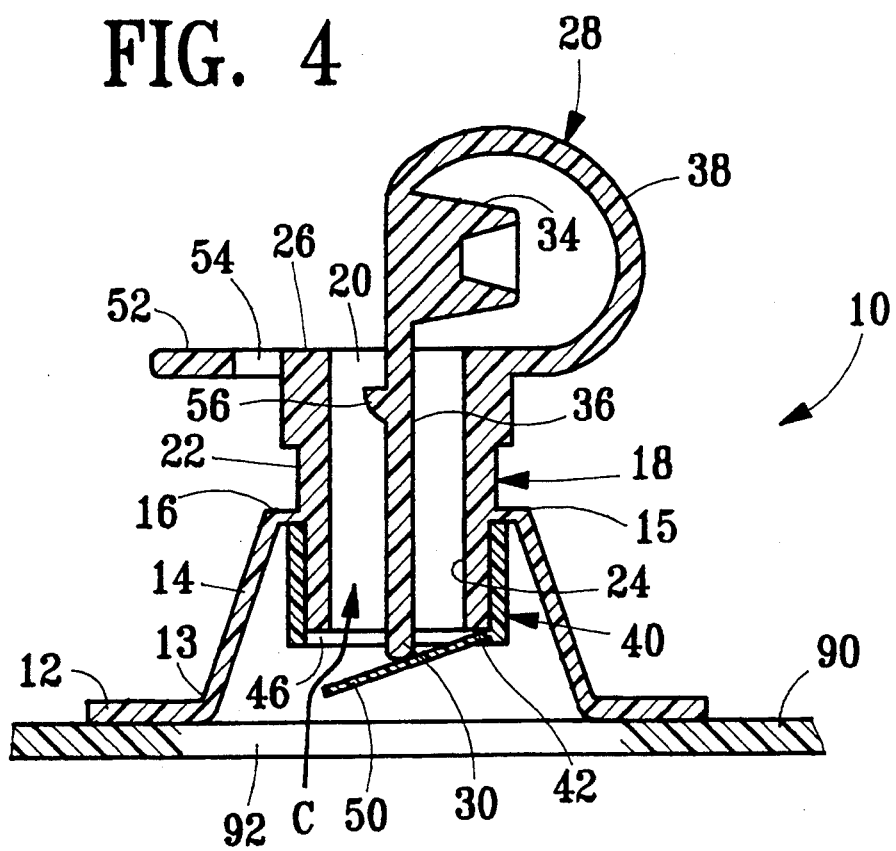
FIG. 4 is a sectional view of the nozzle at deflation condition.

As shown in FIG. 4, the length of the first plug arm portion 36 is longer than the length of the air passage 20. To deflate the inflatable object 90, only the first plug arm portion 36 has to be inserted into the air passage 20 after the second plug arm portion 38 is bent so that the knob 30 is extended to push the one way membrane 50 of the sealing element 40 away from the bottom 46 of the vertical cylindrical body 18 to provide an opening for discharge of air from the inflatable object 90 in a direction as shown by an arrow C.

Figure 5:
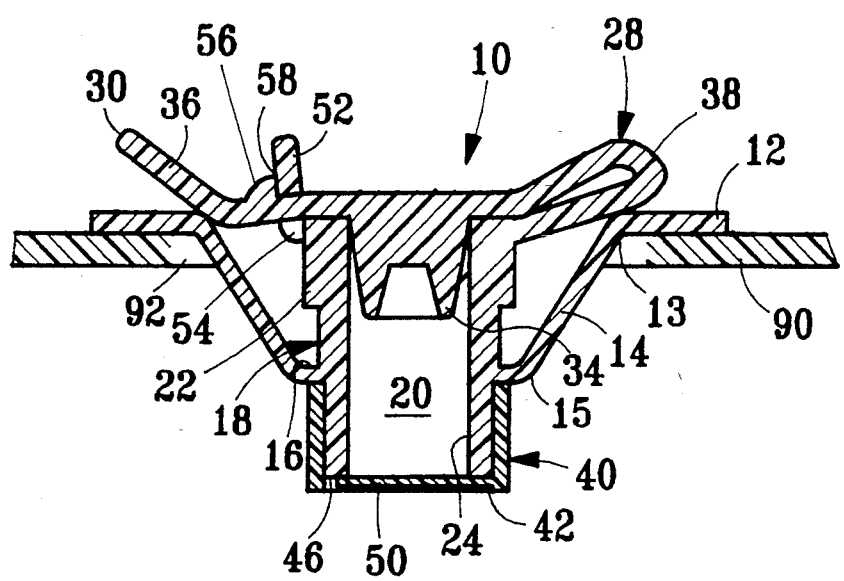
FIG. 5 is a sectional view of the nozzle when it is depressed and bent but remains at closing state.
Figure 6:
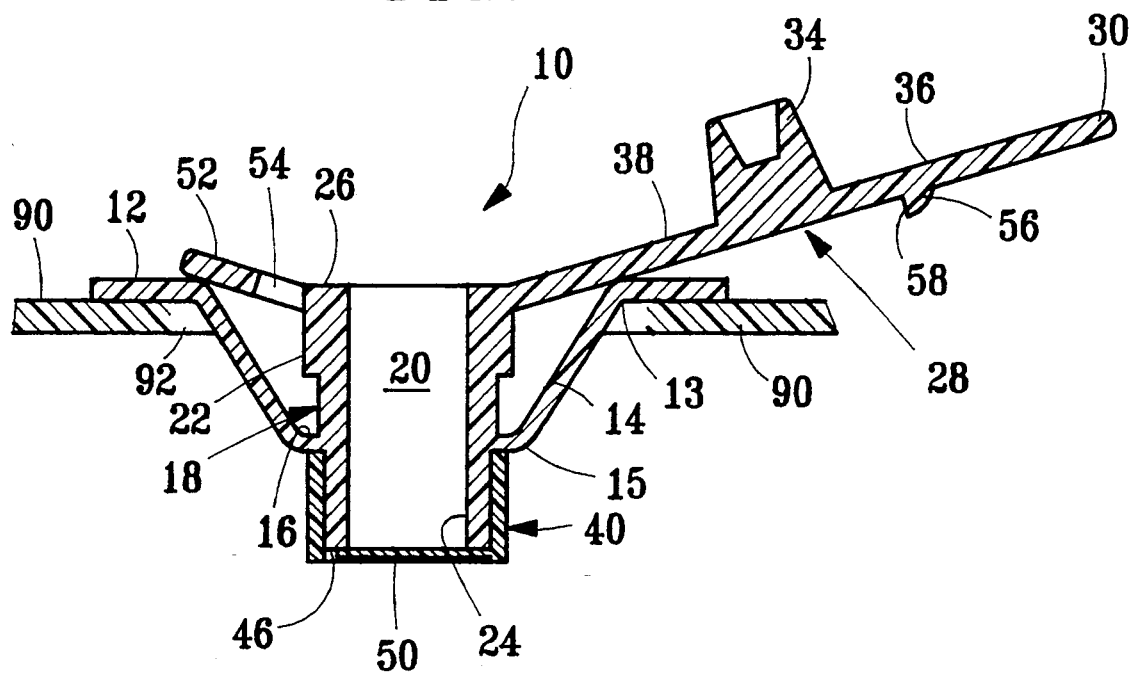
FIG. 6 is a sectional view of the nozzle at a closing state similar to that in FIG. 5 though the plug has been accidentally disengaged from or removed from the air passage.

Because the nozzle according to the present invention is formed with flexible plastic material, application of a downward pressure on the nozzle body 10 can retract the vertical cylindrical body 18 and sealing element 40 into the inflatable object 90 till the top of the nozzle body 10 is substantially flush with the surface of the inflatable object 90 as shown in FIGS. 5 through 8. For such a retraction, a lower turning connection 13 between the nozzle seat 12 and the conical wall 14, and an upper turning connection 15 between the conical wall 14 and the annular horizontal wall 16 serve as hinges. As shown in FIG. 5, when the nozzle body 10 is retracted by application of a pressure, the vertical cylindrical body 18 and the sealing element 40 are displaced linearly without any rotating movement. Therefore, the one-way membrane 50 of the sealing element 40 keeps close contact with the bottom 46 of the vertical cylindrical body 18 to prevent leakage even if the plug 34 is accidentally disengaged due to external force as shown in FIG. 6. In other words, even though the nozzle body 10 has been retracted and the plug 34 has been disengaged, the sealing element 40 can maintain an airtight seal to prevent leakage of air from the inflatable object 90.

Figure 7:
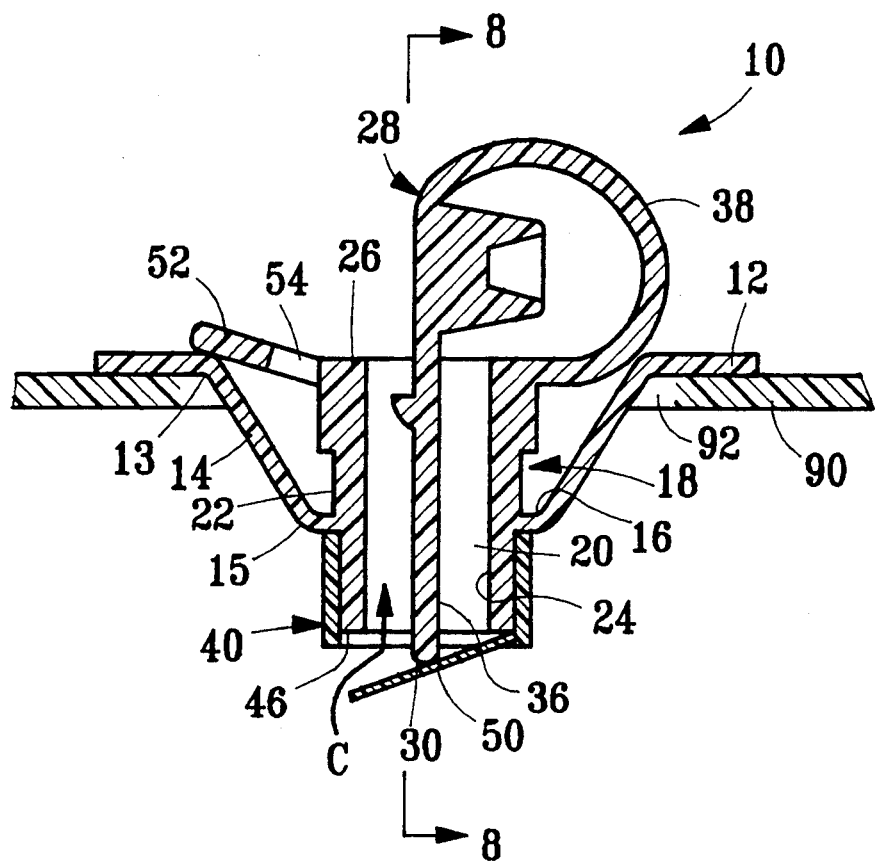
FIG. 7 is a sectional view of the nozzle at deflation state when the nozzle is depressed and bent.
Figure 8:
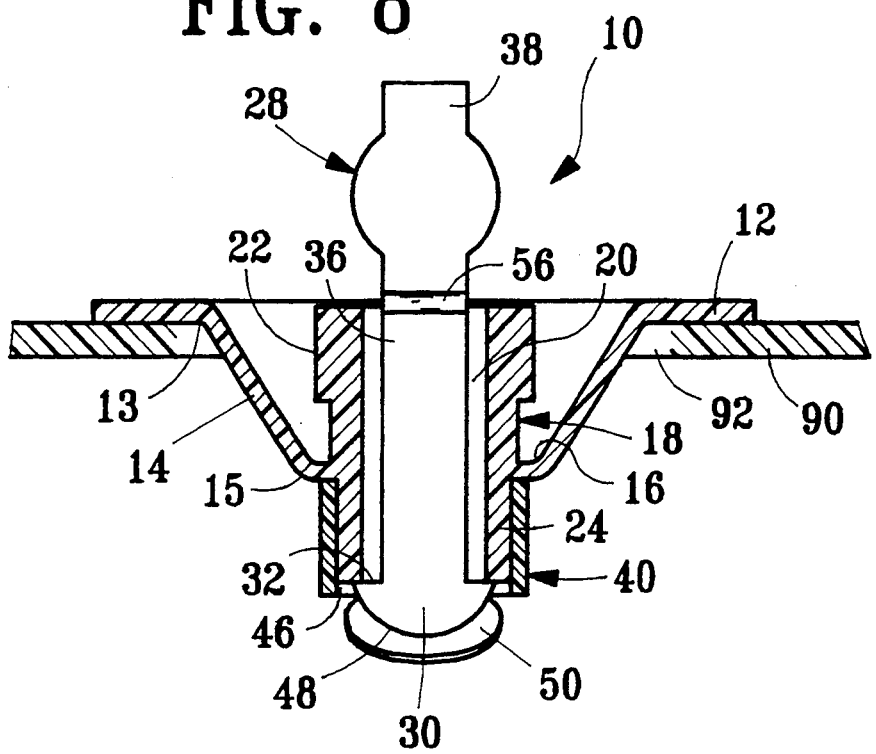
FIG. 8 is a sectional view of the nozzle taken along a line 8—8 in FIG. 7.

Please refer to FIGS. 7 and 8. The sealing element 40 permits deflation with a simple procedure from time to time when the nozzle body 10 is at the normal position as shown in FIG. 4 or the retracted position shown in FIGS. 7 and 8. To deflate the inflatable object 90, only the first plug arm portion 36 has to be inserted into the air passage 20 after the second plug arm portion 38 is bent so that the knob 30 is extended to push the one way membrane 50 of the sealing element 40 away from the bottom end (or edge) 46 of the vertical cylindrical body 18 to provide an opening for discharge of air from the inflatable object 90 in a direction as shown by an arrow C. The brake surface 32 of the knob 30 has a width slightly greater than the inner diameter of the air passage 20 to engage with the bottom edge 46 of the vertical cylindrical body 18 so that the first plug arm portion 36 is maintained at the discharge position as shown in FIG. 8, against the thrust force of the air current C.

Figure 9:
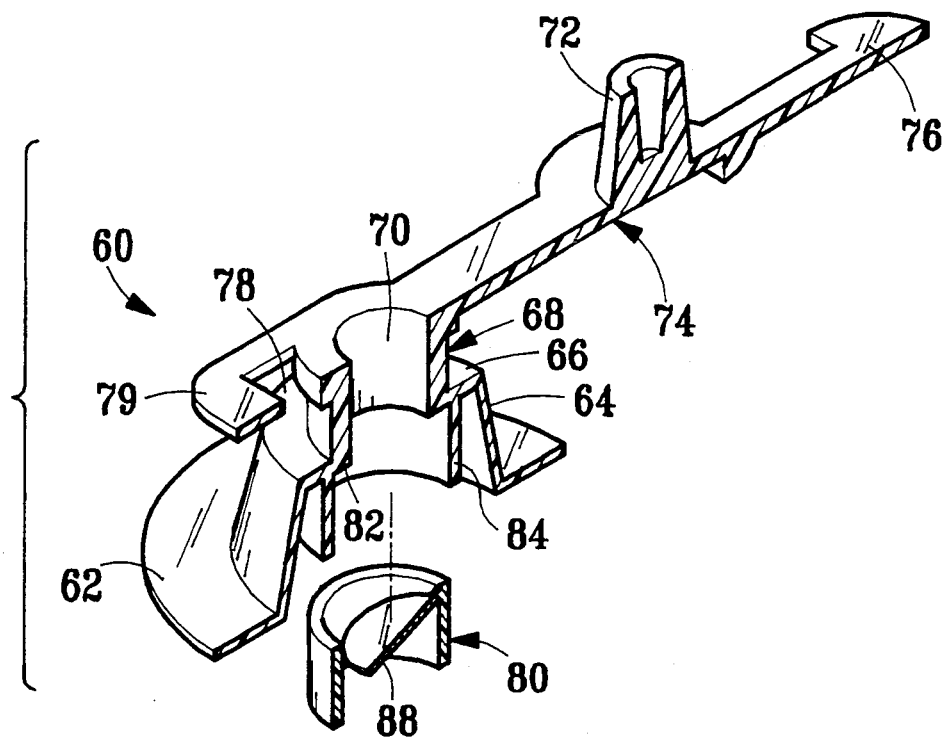
FIG. 9 is a perspective fragmental view of the second embodiment of a nozzle for inflatable object according to the present invention.
Figure 10:
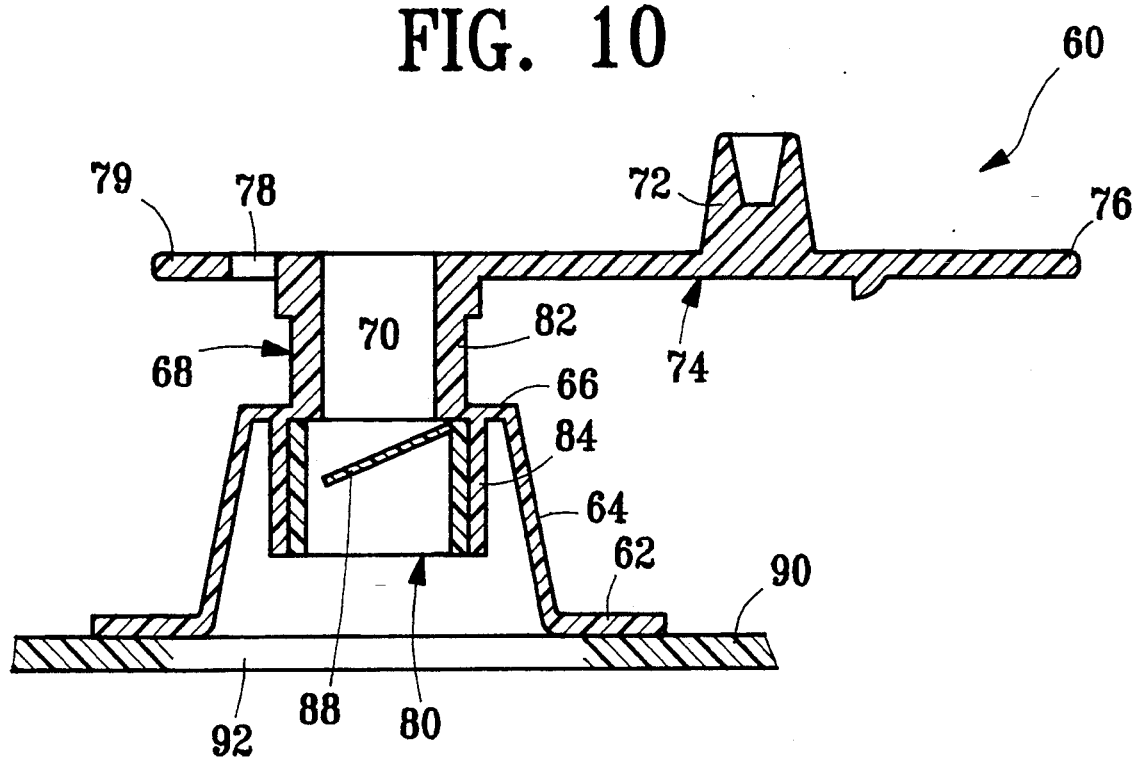
FIG. 10 is a sectional view of the nozzle at inflating condition after being assembled.

Please refer to FIGS. 9 and 10, which illustrates another embodiment of the nozzle according to the present invention. The structure there shown includes the nozzle body 60, the sealing element 80 composed of a vertical sleeve body and an one-way membrane 88, the nozzle seat 62, the conical wall 64, the annular horizontal wall 66, the vertical cylindrical body 68, the air passage 70, the plug 72, the plug arm 74, the knob 76 and the tab 79 with a hole 78 identical to corresponding components in the first embodiment of the present invention shown in FIGS. 1 through 8. The structure of FIGS. 9 and 10 is different from the first embodiment as regards the inner diameter of the vertical cylindrical body 68, which is divided into two part by the annular horizontal wall 66: an upper cylindrical body 82 and a lower cylindrical body 84 are of different diameters. The inner part of the upper cylindrical body 82 forms an air passage 70. The inner diameter of the lower cylindrical body 84 is greater than the inner diameter of the upper cylindrical body 82 to form a space to contain a sealing element 80. The sealing element comprises a sleeve that is closely fitted to the inner wall of the lower cylindrical body 84. An one-way membrane 88 is secured at one end to the upper edge of the sealing element sleeve. The one-way membrane 88 can swing freely, for sealing the air passage tightly. When the one-way membrane 88 of the sealing element 80 has not been pushed downward by the knob 76, it allows air to enter the inflatable object 90 from the external atmosphere through the air passage 70, but does not allow the air to flow out from the inflatable object 90.

The one-way membrane is secured to the sealing element rather than formed as an integrated part of the nozzle body. Therefore, production of the nozzle is easy, and its production cost is low.

Many changes and modifications in the above described embodiments of the invention can, of course, be carried out without departing from the scope thereof. Accordingly, to promote the program in science and the useful arts, the invention is disclosed and is intended to be limited only by the scope of the appended claims.

What is claimed:

1. A nozzle for an inflatable object, comprising:
a tubular body (18) forming an air passage, said tubular body having an inner end presented to the space circumscribed by the inflatable object, and an outer end facing away from the inflatable object; means for mounting said tubular body on the inflatable object, comprising an annular diaphragm (14 hingedly connected to said tubular body at a point approximately - midway between inner and outer ends of said tubular body, whereby the tubular body can be pushed into the inflatable object or pulled out of the inflatable object;
a sealing element formed separately from said tubular body, said sealing element comprising a mounting sleeve, and a flap-like membrane hingedly joined to said mounting sleeve for sealing engagement against the inner end of said tubular body; said mounting sleeve having a telescopic fit on the tubular body, and said membrane having a normal position extending transversely across the mounting sleeve;
an elongated flexible arm (28) hingedly connected to said tubular body near its outer end; and a sealing plug (34) carried by said arm for sealing engagement with the air passage when said elongated arm is extended transversely across the outer end of said tubular body;
said elongated arm being insertable into the air passage to push said membrane away from the inner end of said tubular body, whereby pressurized air can then flow out of the inflatable object through said air passage.

2. The nozzle of claim 1, wherein said tubular body has an inner surface and an outer surface; said mounting sleeve having a telescopic fit on the outer surface of the tubular body.

3. The nozzle of claim 4, wherein said tubular body has an inner surface and an outer surface; said mounting sleeve having a telescopic fit on the inner surface of the tubular body.

* * * * *